United States Patent
Eggimann et al.

(10) Patent No.: US 11,734,683 B2
(45) Date of Patent: Aug. 22, 2023

(54) AUTHENTICATION FOR SECURE TRANSACTIONS IN A MULTI-SERVER ENVIRONMENT

(71) Applicant: MASTERCARD INTERNATIONAL INCORPORATED, Purchase, NY (US)

(72) Inventors: Christopher Eggimann, Brooklyn, NY (US); Manu Dharmaiah Kallugudde, Berkshire (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 211 days.

(21) Appl. No.: 17/001,880

(22) Filed: Aug. 25, 2020

(65) Prior Publication Data
US 2021/0117967 A1    Apr. 22, 2021

(30) Foreign Application Priority Data
Oct. 18, 2019  (EP) .................................... 19204011

(51) Int. Cl.
*G06Q 20/38*     (2012.01)
*G06Q 20/40*     (2012.01)

(52) U.S. Cl.
CPC .......... *G06Q 20/40* (2013.01); *G06Q 20/382* (2013.01); *G06Q 20/38215* (2013.01);
(Continued)

(58) Field of Classification Search
CPC combination set(s) only.
See application file for complete search history.

(56) References Cited

U.S. PATENT DOCUMENTS

| 8,768,803 B2 | 7/2014 | DeWanz et al. |
| 2007/0100691 A1* | 5/2007 | Patterson ........... G06Q 30/0211 705/14.13 |

(Continued)

FOREIGN PATENT DOCUMENTS

| WO | WO2011/127177 | 10/2011 |
| WO | WO2019/013854 | 1/2019 |

OTHER PUBLICATIONS

EMV® 3-D Secure™ protocol/specification; https://www.emvco.com/emv-technologies/3d-secure/; 2020 ©; 6 pgs.
(Continued)

*Primary Examiner* — Jacob C. Coppola
(74) *Attorney, Agent, or Firm* — Harness, Dickey & Pierce, P.L.C.

(57) ABSTRACT

Disclosed herein is a computer implemented method for providing authentication for secure transactions in a multi-server system, the method comprising; receiving, at an authentication server from a requestor server, a request for a cryptogram, the request being associated with a transaction and including a requestor identifier; in response to receiving the request, generating a cryptogram; sending, from the authentication server, the cryptogram to the requestor server; receiving, at the authentication server from a merchant server, the cryptogram, a payment token, and a unique merchant identifier, and a merchant secret; validating, at the authentication server, the cryptogram; comparing, at the authentication server, the unique merchant identifier and the merchant secret with a unique merchant identifier and a merchant secret pair stored in a database; and authorizing, at the authentication server, the transaction when there is a match.

16 Claims, 6 Drawing Sheets

(52) U.S. Cl.
CPC ..... *G06Q 20/4014* (2013.01); *G06Q 20/4016* (2013.01); *G06Q 20/4018* (2013.01); *G06Q 2220/00* (2013.01); *H04L 2209/56* (2013.01)

(56) References Cited

U.S. PATENT DOCUMENTS

| | | |
|---|---|---|
| 2008/0154770 A1 | 6/2008 | Rutherford et al. |
| 2008/0283594 A1* | 11/2008 | Unbehagen ............ G06Q 40/00 235/380 |
| 2011/0161671 A1* | 6/2011 | Whitehouse ........ G06F 21/6236 713/150 |
| 2011/0208658 A1 | 8/2011 | Makhotin |
| 2011/0225094 A1* | 9/2011 | Hammad ............. G06Q 20/401 705/44 |
| 2011/0251892 A1* | 10/2011 | Laracey ................. G06Q 20/20 705/16 |
| 2012/0041881 A1* | 2/2012 | Basu ................ G06Q 20/38215 705/67 |
| 2012/0221468 A1* | 8/2012 | Kumnick ............. G06Q 20/306 705/44 |
| 2014/0025577 A1* | 1/2014 | Lisznianski ............ G06Q 20/20 705/44 |
| 2014/0129441 A1 | 5/2014 | Blanco et al. |
| 2015/0161603 A1* | 6/2015 | Fish .................. G06Q 30/0261 705/44 |
| 2015/0262180 A1 | 9/2015 | Hambleton et al. |
| 2015/0371226 A1 | 12/2015 | Hurley et al. |
| 2016/0034870 A1* | 2/2016 | Howe ................ G06Q 20/4016 705/40 |
| 2016/0036790 A1 | 2/2016 | Shastry et al. |
| 2016/0125417 A1 | 5/2016 | Huang et al. |
| 2016/0162886 A1* | 6/2016 | Howe .................. G06Q 20/382 705/44 |
| 2017/0161733 A1* | 6/2017 | Koletsky ............... G06Q 20/382 |
| 2017/0178137 A1* | 6/2017 | Pachouri ............ H04L 63/0838 |
| 2017/0345008 A1* | 11/2017 | Ford .................. G06Q 20/3825 |
| 2017/0366530 A1 | 12/2017 | Dominguez et al. |
| 2018/0108008 A1* | 4/2018 | Chumbley ............. G06Q 20/36 |
| 2018/0197174 A1* | 7/2018 | Daetz ................. G06Q 20/3821 |
| 2018/0322489 A1* | 11/2018 | Altenhofen ........... G06Q 20/40 |
| 2019/0020478 A1* | 1/2019 | Girish ................... H04L 63/083 |
| 2019/0026735 A1* | 1/2019 | Parekh ............... G06Q 20/4012 |
| 2019/0108515 A1 | 4/2019 | Lakka et al. |
| 2019/0318345 A1* | 10/2019 | Kallugudde ........ G06Q 20/3226 |
| 2020/0382486 A1 | 12/2020 | Dunjic et al. |
| 2021/0119790 A1 | 4/2021 | Eggimann et al. |

OTHER PUBLICATIONS

U.S. Appl. No. 17/001,863, filed Aug. 25, 2020, Eggimann et al.

* cited by examiner

Figure 2 — Prior Art

AUTHENTICATION FOR SECURE TRANSACTIONS IN A MULTI-SERVER ENVIRONMENT

CROSS-REFERENCE TO RELATED APPLICATION

This application claims the benefit of, and priority to, European Patent Application No. 19204011.1 filed on Oct. 18, 2019. The entire disclosure of the above application is incorporated herein by reference.

FIELD

The present disclosure generally relates to methods, devices, and systems to provide authentication for secure transactions in a multi-server environment.

BACKGROUND

This section provides background information related to the present disclosure which is not necessarily prior art.

All service industries are moving towards providing an enhanced user experience for both consumers and merchants. The payments industry is no exception, and such enhancements can be provided by various digital solutions. Such solutions cause an ever increasing amount of information to be sent during a payment transaction compared to traditional methods where only card information was sufficient to process a transaction.

Traditional cashless payment methods and transactions involve a static payment token being sent to merchants in the commerce platforms. The use of static payment tokens presents a severe security risk in that if a static payment token is obtained by a nefarious party, the obtained static payment token can be used to perform multiple illegitimate transactions without a payer's consent until the payer's static payment token is changed.

The use of dynamic payment credentials, i.e., dynamic payment tokens, is therefore essential to provide higher security to the payment transactions and to reduce the risk of fraud attacks and chargebacks. However, when dynamic payment credentials are shared across entities there is still a risk of so called 'man-in-the-middle-attacks', where a nefarious party eavesdrops on the communication channels between secure payment entities, such as a merchant server and an authentication server, there is also a risk that unscrupulous merchants can misuse the payment credentials.

Digital payments have crossed all the boundaries, plastic cards are moving into consumer mobile phones and other devices, such as wearables, keys etc. with the help of technologies, such as tokenization, card on file transactions, and wallets, etc. In current payment systems, payment tokens are created for payment account numbers (PAN) and during a transaction, a cryptogram is generated and which moves between entities of a payment system with any payment tokens to provide better security. However, this mechanism is limited with regard to online commerce platforms, such as Facebook® marketplace, which involve multiple servers in the processing of an electronic payment, namely a marketplace server and a merchant server. Currently payment tokens in such environments are shared between these servers, meaning that a nefarious third party obtaining access to e.g., the marketplace server or performing a successful man in the middle attack in communications between the marketplace server and the merchant server can obtain valid payment tokens with which fraudulent transactions can be conducted There is thus a need to provide improved security in multi-server environments where payment tokens which are shared between multiple servers.

SUMMARY

This section provides a general summary of the disclosure, and is not a comprehensive disclosure of its full scope or all of its features. Aspects and embodiments of the disclosure are set out in the accompanying claims.

It is an object of the present disclosure to provide a device, system, and method for an enhanced authentication mechanism during a payment transaction in a multi-server environment.

According to an aspect there is provided a computer implemented method for providing authentication for secure transactions in a multi-server system, the method comprising; receiving, at an authentication server from a requestor server, a first request for a cryptogram, the first request being associated with a transaction and including a requestor identifier; in response to receiving the first request, generating a cryptogram; sending, from the authentication server, the cryptogram to the requestor server; receiving, at the authentication server from a merchant server the cryptogram, a payment token, and a unique merchant identifier, and a merchant secret; validating, at the authentication server, the cryptogram; comparing, at the authentication server, the unique merchant identifier and the merchant secret with a unique merchant identifier and a merchant secret pair stored in a database; and authorizing, at the authentication server, the transaction when there is a match.

According to an aspect there is provided a system comprising at least one processor configured to perform the computer implemented method of providing authentication for secure transactions in a multi-server system, the method comprising; receiving, at an authentication server from a requestor server, a first request for a cryptogram, the first request being associated with a transaction and including a requestor identifier; in response to receiving the first request, generating a cryptogram; sending, from the authentication server, the cryptogram to the requestor server; receiving, at the authentication server from a merchant server the cryptogram, a payment token, and a unique merchant identifier, and a merchant secret; validating, at the authentication server, the cryptogram; comparing, at the authentication server, the unique merchant identifier and the merchant secret with a unique merchant identifier and a merchant secret pair stored in a database; and authorizing, at the authentication server, the transaction when there is a match.

According to an aspect there is provided a non-transitory computer-readable storage medium storing instructions thereon which, when executed by a processor, cause the processor to perform the computer implemented method of providing authentication for secure transactions in a multi-server system, the method comprising; receiving, at an authentication server from a requestor server, a first request for a cryptogram, the first request being associated with a transaction and including a requestor identifier; in response to receiving the first request, generating a cryptogram; sending, from the authentication server, the cryptogram to the requestor server; receiving, at the authentication server from a merchant server the cryptogram, a payment token, and a unique merchant identifier, and a merchant secret; validating, at the authentication server, the cryptogram; comparing, at the authentication server, the unique merchant identifier and the merchant secret with a unique merchant identifier and a merchant secret pair stored in a database; and authorizing, at the authentication server, the transaction when there is a match.

Additional aspects of the present disclosure are set out in the appended dependent claims.

What's more, further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. That said, aspects of the present disclosure will now be described by way of example with reference to the accompanying figures. In the figures.

DETAILED DESCRIPTION

Embodiments will be described, by way of example only, with reference to the drawings. The description and specific examples included herein are intended for purposes of illustration only and are not intended to limit the scope of the present disclosure. That said, the following description is presented to enable any person skilled in the art to make and use the disclosure, and is provided in the context of a particular application. Various modifications to the disclosed embodiments will be readily apparent to those skilled in the art.

Embodiments of the present disclosure provide a technology infrastructure which improves the security of payment tokens for payment transactions performed in multi-server environments, such as commerce and/or e-commerce platforms. The improved security can reduce fraud rates. The parties involved, may be for example, those of: a merchant, any issuers, any third parties, and the network.

Figure 1:
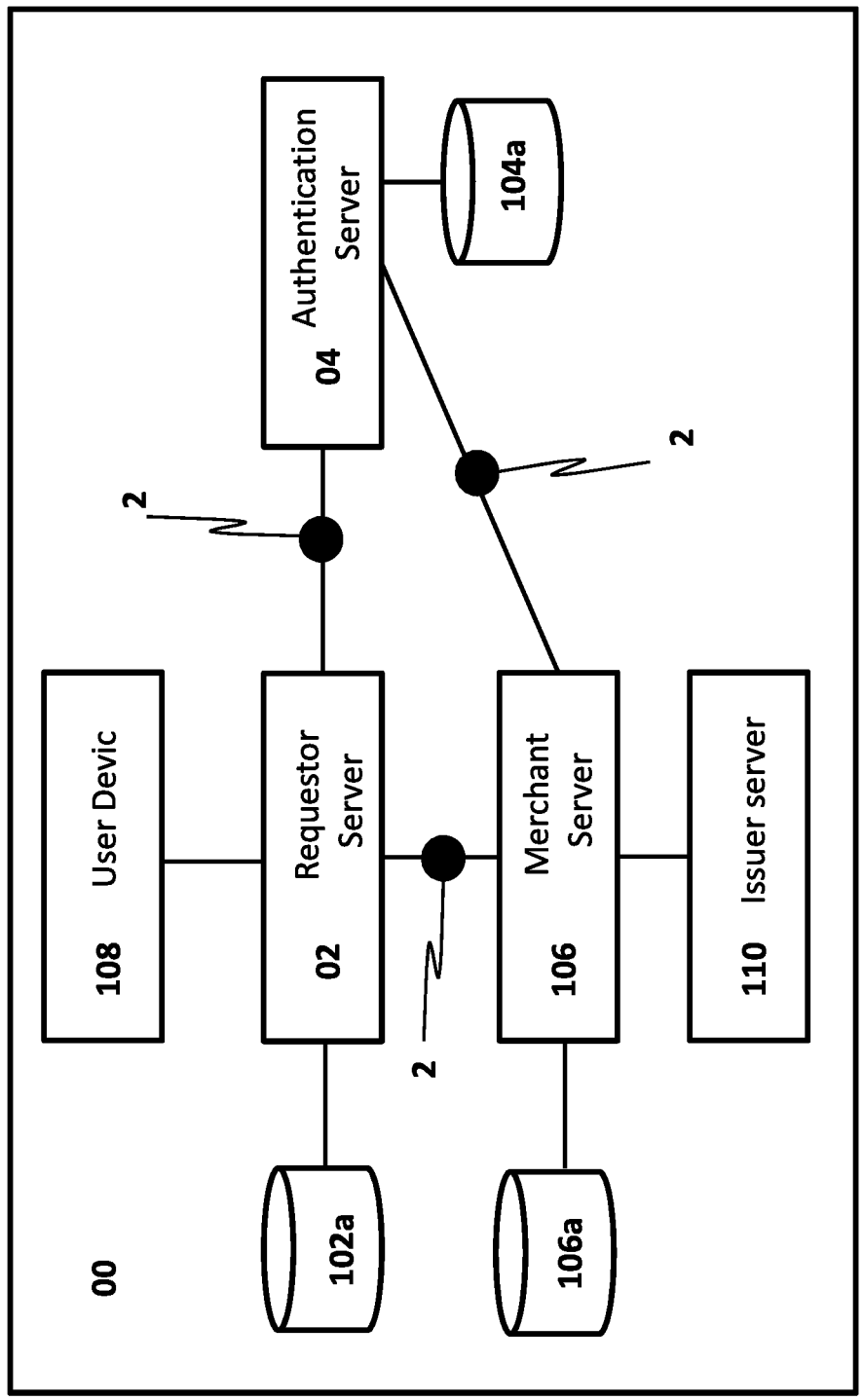
FIG. 1 is a block diagram illustrating an exemplary multi-server system for authentication according to some embodiments of the disclosure.

Turning now to the figures, FIG. 1 illustrates an exemplary multi-server environment, system 100, which is suitable for authorizing payment transactions and by which one or more aspects of the disclosure may be implemented. Although the system 100 is presented in one arrangement, it should be clear that other embodiments may include additional or equivalent parts. The system 100 may be a computer network or other suitable networked system.

The illustrated system 100 generally includes a requestor server 102 which is associated with an online marketplace, a requestor server database 102a, an authentication server 104, an authentication server database 104a, a merchant server 106 which is associated with an online merchant having a presence in the online marketplace, a merchant server database 106a, a user device 108, and an issuer server 110. The user device 108 may be a mobile device (e.g., a mobile phone), a personal computer, or the like. The issuer server 110 may be operated by the user's bank and may issue payments when a transaction is validated.

The requestor server 102 and the authentication server 104 are communicably coupled with each other, for example, via the internet. The connection between the requestor server 102 and the authentication server 104 may be a secure connection. The requestor server 102 and the merchant server 106 are communicably coupled with each other, for example, via the internet. The authentication server 104 and the merchant server 106 are communicably coupled with each other, for example, via the internet. The merchant server 106 and the user device 108 are communicably coupled with each other, for example, via the internet. Nefarious parties 112 may be able to intercept communications between the requestor server 102, the authentication server 104, and the merchant server 106, and/or may attempt to gain direct access to data stored in requestor server database 102a.

Figure 2:
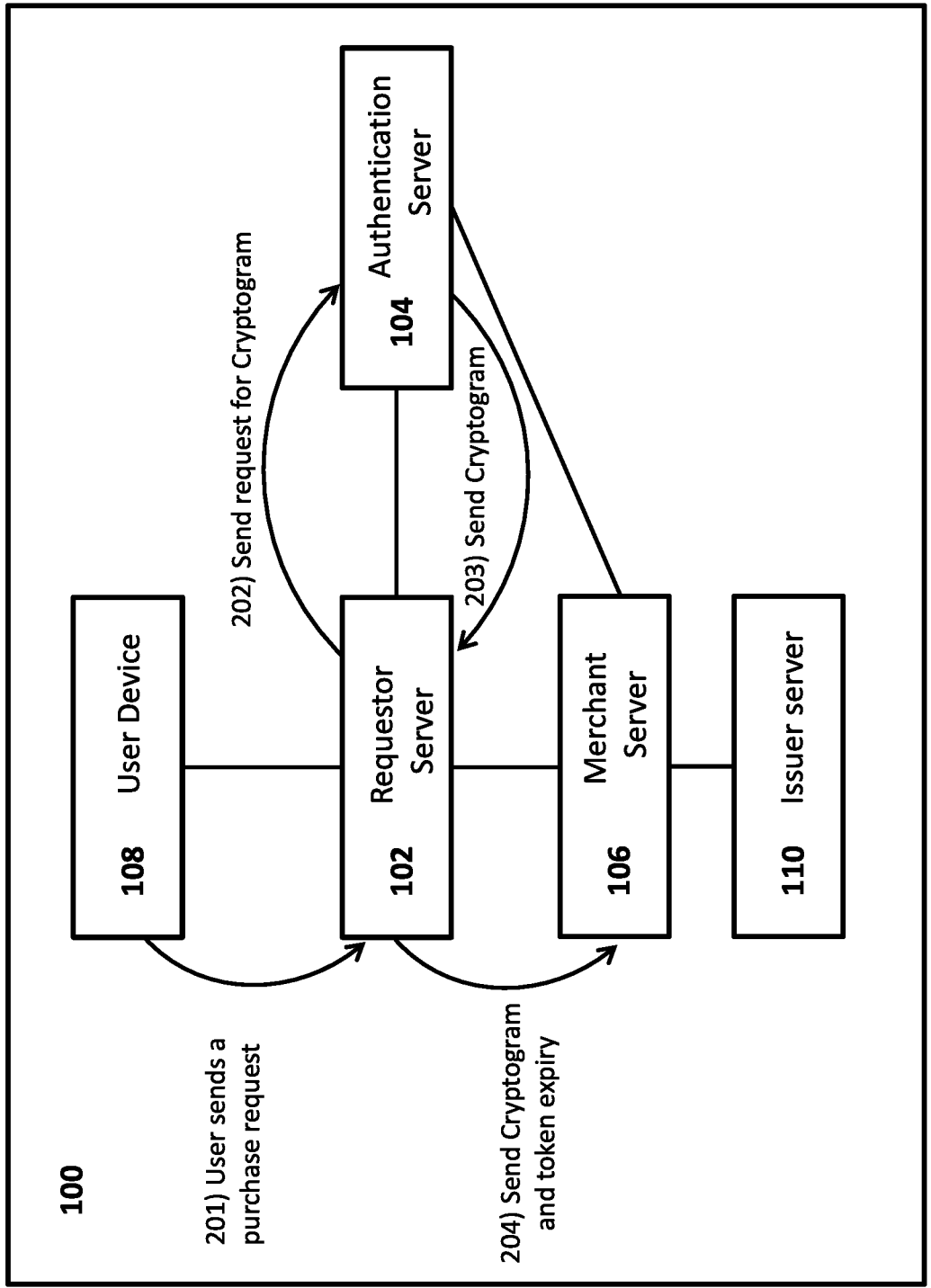
FIG. 2 is a block diagram and process flow illustrating a prior art authentication process of a multi-server system.

FIG. 2 illustrates a prior art authentication process flow performed between the entities of system 100. The following is a description of a prior art online marketplace (e-commerce platform) payment transaction, wherein at least one online merchant is registered with the online marketplace. The at least one online merchant provides goods and/or services to be purchased on the online marketplace.

The illustrated process flow of FIG. 2 generally includes the following features. A user, who is the consumer, using user device 108 creates or has an account with requestor server 102 of an online marketplace. The online marketplace may be, for example, Facebook® marketplace. The requestor server 102 stores the user's payment credentials, which may be, for example, payment card details, in requestor server database 102a. For example, where the online marketplace is Facebook® marketplace, the user's payment credentials are stored in the user's Facebook® account.

The requestor server 102 tokenizes the user's payment credentials to create a payment token and links the payment token to the user's payment account number (PAN). The requestor server 102 stores the payment token in its system, for example, in the requestor server database 102a. The payment token generated from the user's payment credentials is typically not unique to a particular merchant, and the payment token is used by the online marketplace for all the merchants in the marketplace when the user wishes to make a purchase, for example, the payment token may only change when a user inputs new card details into the online marketplace resulting in a new token being generated. This creates a security vulnerability because if the static payment token is intercepted by a man-in-the-middle-attack, for example, by nefarious parties 112, or obtained directly from requestor server database 102a, it can be copied and/or used by any party to commit fraud until the user's static payment token is changed.

The user's stored payment credentials and/or payment token is used by the requestor server 102 of the online marketplace in payment transactions on each occasion that the user makes a purchase at any merchant via merchant server 106 in the online marketplace.

For example, a first merchant has a sale offering a wholesale discount in Facebook® marketplace. The user/ consumer wishes to take advantage of the wholesale discount by making a purchase from the first merchant. In step 201, the user makes a purchase request to the requestor server 102 via user device 108. In step 202, upon receiving a purchase request from the user device 108, the requestor server 102 of the online marketplace sends a request to the authentication server 104 to obtain a cryptogram to perform the payment. The cryptogram is unique per transaction. The cryptogram may include dynamic data, for example, a sequence counter, and/or ATC check parameters, etc.

In step 203, the authentication server 104 sends the cryptogram to the requestor server 102 of the online marketplace.

In step 204, the requestor server sends the cryptogram, the payment token, and a payment token expiry date, to the merchant server 106.

The merchant server 106 then initiates and completes the payment transaction with the received cryptogram and the payment token with the issuer server 110 of the user.

This prior art online marketplace payment transaction has several drawbacks. Firstly, the online merchant is capable of using the payment token to receive an unauthorized amount from the user/consumer's bank. Neither the online marketplace nor the user/consumer has control over the online merchant using the payment token to receive an unauthorized amount from the user/consumer's bank. Secondly, if another online merchant, or third party, obtains both the payment token, and the payment token expiry, for example, through a man-in-the-middle attack, and sends the payment token to receive funds from the user's bank, both the authentication server 104 and the issuer server 110 would still approve the transaction, in a so called 'replay attack'.

In addition to the clearly undesirable instances of fraud that such attacks can facilitate, the misuse of payment tokens by nefarious parties and/or through mistakes made by online merchants in the processing of payment tokens reduces an issuer's trust in payment tokens.

Figure 3:
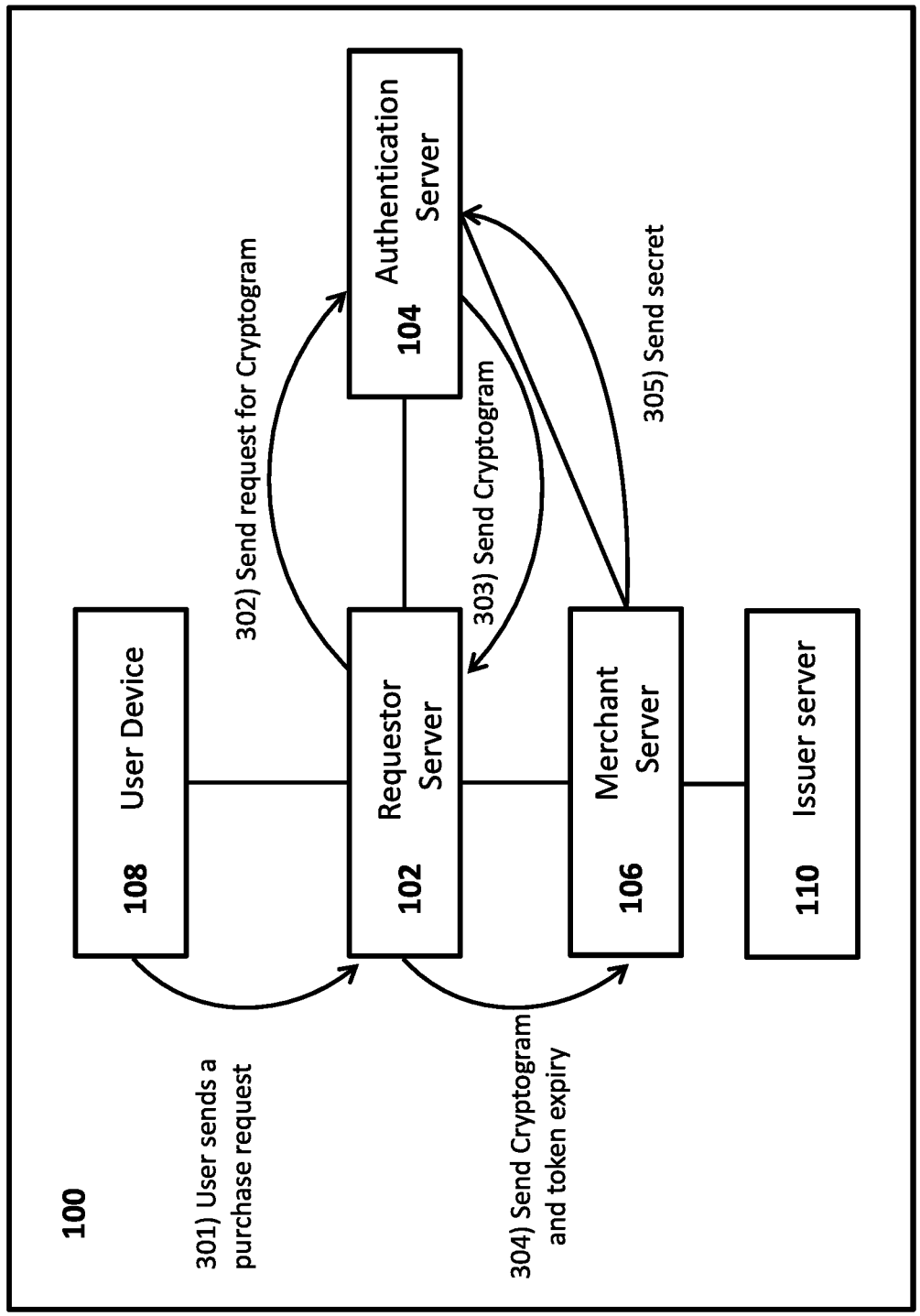
FIG. 3 is a block diagram and process flow illustrating an authentication process of a multi-server system according to some embodiments of the disclosure.

FIG. 3 illustrates an exemplary authentication process flow performed between the entities of system 100, by which one or more aspects of the disclosure may be implemented. Although the process flow is presented in one arrangement, it should be clear that other embodiments may include additional or equivalent parts.

The following is a description of an authentication process for an online marketplace payment transaction according to embodiments of the present disclosure. The at least one online merchant is registered with the online marketplace and provides goods and/or services to be purchased on the online marketplace.

The illustrated process flow of FIG. 3 generally includes the following features. A user, who is the consumer, using user device 108 creates or has an account with requestor server 102 of an online marketplace. The online marketplace may be, for example, Facebook® marketplace. The requestor server 102 of the online marketplace stores the user's payment credentials which may be, for example, payment card details, in requestor server database 102a. For example, where the online marketplace is Facebook® marketplace, the user's payment credentials are stored in the user's Facebook® account.

The requestor server 102 of the online marketplace tokenizes the user's payment credentials to create a payment token and links the payment token to the user's payment account number (PAN). The requestor server 102 of the online marketplace stores the payment token in its system, for example, in the requestor server database 102a. Again, the payment token generated from the user's payment credentials is typically not unique to a particular merchant, and the payment token is used by the online marketplace for all the merchants in the marketplace when the user wishes to make a purchase, for example, the payment token may only change when a user inputs new card details into the online marketplace resulting in a new token being generated.

Requestor server 102 has a Token Request Identifier (TRID) assigned to it by authentication server 104. The TRID is unique to each requestor server, enabling authentication server 104 to support concurrent operations with multiple requestor servers and hence multiple online marketplaces. TRIDs per se are known in the art and may be issued within a transaction system. The TRID is stored at the requestor server 102 of the online marketplace, for example, in the requestor server database 102a.

Each merchant which operates on the online marketplace has a unique identifier, for example, a Commerce Merchant Identifier (CMID), and a commerce merchant secret, both of which are unique to the merchant. The CMID uniquely identifies a merchant which operates on the online marketplace and in an ecosystem. The CMID may not be globally unique. The CMID may be, for example, 4 characters and take the form of an expiry date, for example, a card expiry date or a payment token expiry date (yy/mm). The commerce merchant secret may be, for example, 3 characters and take the form of a CVV or CVC2 code. The commerce merchant secret may have a relatively long lifetime of 1 to 2 years or more, and may be used more than once by the respective merchant.

The CMID is generated, assigned, and provided securely to the requestor server 102 of the online marketplace by the authentication server 104 during enrollment of a merchant server 106 of a merchant with the requestor server 102. The commerce merchant secret is generated, assigned, and provided securely to the merchant server 106 of a merchant by the authentication server 104 during enrollment of the merchant with the requestor server 102. The requestor server 102 of the online marketplace does not receive or store the commerce merchant secret. The CMID is stored by the requestor server 102 of the online marketplace, in the requestor server database 102a, and by the authentication server 104 in the authentication server database 104a. The commerce merchant secret is stored by the merchant server 106, in the merchant server database 106a, and by the authentication server 104 in the authentication server database 104a.

Alternatively, or additionally, the authentication server 104 may send a one-time password (OTP) to the merchant server 106. The OTP enables the merchant server 106 to communicate with the authentication server 104 directly. This creates a secure communication channel between the merchant server 106 and the authentication server 104 which may be used to transmit the commerce merchant secret from the merchant server 106 to the authentication server 104.

The payment credentials and/or payment token may be used whenever the user/consumer wishes to perform a transaction at the online marketplace. The TRID, CMID, and commerce merchant secret are used to enhance the security of such a transaction where each of the TRID, CMID, and the commerce merchant secret are sent in a specific scheme and to specific recipients.

Additionally, during a transaction, the requestor server 102 of the online marketplace may send to the authentication server 104 a monetary amount of the transaction in association with the cryptogram. The amount may be contained within the cryptogram. The monetary amount may be a maximum limit and not the price of a specific transaction.

The amount that the cryptogram is to be used for is stored by the authentication server 104 against the cryptogram. The amount may also be valid for only one transaction, which prevents a replay attack as described above.

The following is an example description of an authentication of an online marketplace (e-commerce platform) payment transaction according to some embodiments of the present disclosure, wherein at least one online merchant is registered with the online marketplace. The at least one online merchant provides goods and/or services to be purchased on the online marketplace.

As described above, the first merchant provides goods and/or services for purchase, for example, the first merchant has a sale offering a wholesale discount in Facebook® marketplace. The user/consumer wishes to purchase the goods and/or services and so, in step 301, the user/consumer selects the goods and/or services for purchase at the online marketplace and issues a purchase request to the requestor server 102 of the online marketplace via user device 108.

In step 302, upon receiving the purchase request from the user device 108, the requestor server 102 of the online marketplace sends a request to the authentication server 104 to obtain a cryptogram to perform the payment. The request can include the TRID of requestor server 102 so that the authentication server 104 can identify the online marketplace. The TRID ensures domain control, and that the online marketplace (requestor server) is legitimate.

In step 303, upon receiving, at the authentication server 104, the request from the requestor server 102 of the online marketplace, the authentication server 104 generates a cryptogram. The authentication server 104 then sends the cryptogram to the requestor server 102 of the online marketplace.

In step 304, upon receiving, at the requestor server 102 of the online marketplace, the cryptogram, the requestor server 102 retrieves the CMID from the requestor server database 102a and places the dynamic cryptogram, a payment token, and the CMID into a message. The CMID is placed into a payment token expiry field of the payment token, for example, in the form yy/mm. In this manner, the CMID appears to be a normal expiry date of the payment token to any third parties and not a commerce merchant identifier. The requestor server 102 then sends the message to the merchant server 106.

In step 305, upon receiving, at the merchant server 106, the cryptogram, the payment token, and the CMID, the merchant server 106 retrieves the commerce merchant secret from the merchant server database 106a and places the commerce merchant secret into a message to be sent to the authentication server 104. For example, the merchant server 106 may populate the CVV/CVC2 field of the message with the commerce merchant secret that was obtained from the authentication server 104 at enrollment. In this manner the commerce merchant secret appears to be a regular CVV/CVC2 code to a third party, and not a commerce merchant secret. The merchant server 106 sends the cryptogram, the payment token, the CMID, and the commerce merchant secret, in the message to the authentication server 104.

Upon receiving, at the authentication server 104, the cryptogram, the payment token, the CMID, and the commerce merchant secret, the authentication server 104 validates the cryptogram and de-tokenizes the payment token to obtain an associated payment account number. As described above, the cryptogram may only be valid for a specified amount. Thus the cryptogram validation may also include a comparison between a transaction amount specified in the message and the amount that the cryptogram is valid for. In the event of the transaction amount exceeding the amount that the cryptogram is valid for, the authentication server 104 may not authorize the transaction.

The authentication server 104 also validates and verifies the CMID and the commerce merchant secret received from the merchant server 106. This is achieved by comparing the received CMID and the received commerce merchant secret with the CMID and the commerce merchant secret generated when the merchant server 106 was enrolled by the authentication server 104, as stored in the authentication server database 104a. The CMID and the commerce merchant secret stored by the authentication server database 104a may be linked with the online marketplace TRID. For example, each TRID may be associated with at least one CMID, each CMID having a commerce merchant secret.

When the one or more validations are successful, the transaction is approved and sent to issuer server 110 for final authorization.

Embodiments of the disclosure provide several advantages over existing systems. If the online marketplace is compromised by any third party, e.g. by gaining access to requestor server database 102a, the third party is still not able to obtain the commerce merchant secret as this is not stored in requestor server database 102a, nor is it known to requestor server 102. As such, subsequent illegitimate transactions made by the third party will not include the commerce merchant secret and will not be approved by the authentication server 104.

Additionally, embodiments described are less susceptible to man-in-the-middle attacks in several ways. Firstly, the third party performing the man-in-the-middle attack will not be able to determine that a commerce merchant secret is required. Secondly, the third party performing the man-in-the-middle attack will not realize that the expiry field of the payment token is a CMID. Thirdly, the third party performing the man-in-the-middle attack will not realise that the CVC/CVC2 field of the message is the commerce merchant secret. Thus, the commerce merchant identifier and the commerce merchant secret validation steps ensure that an authentic merchant has performed the transaction. When an amount is linked to the cryptogram, the cryptogram validation ensures domain control and prevents replay attacks by providing amount checks.

Figure 4:
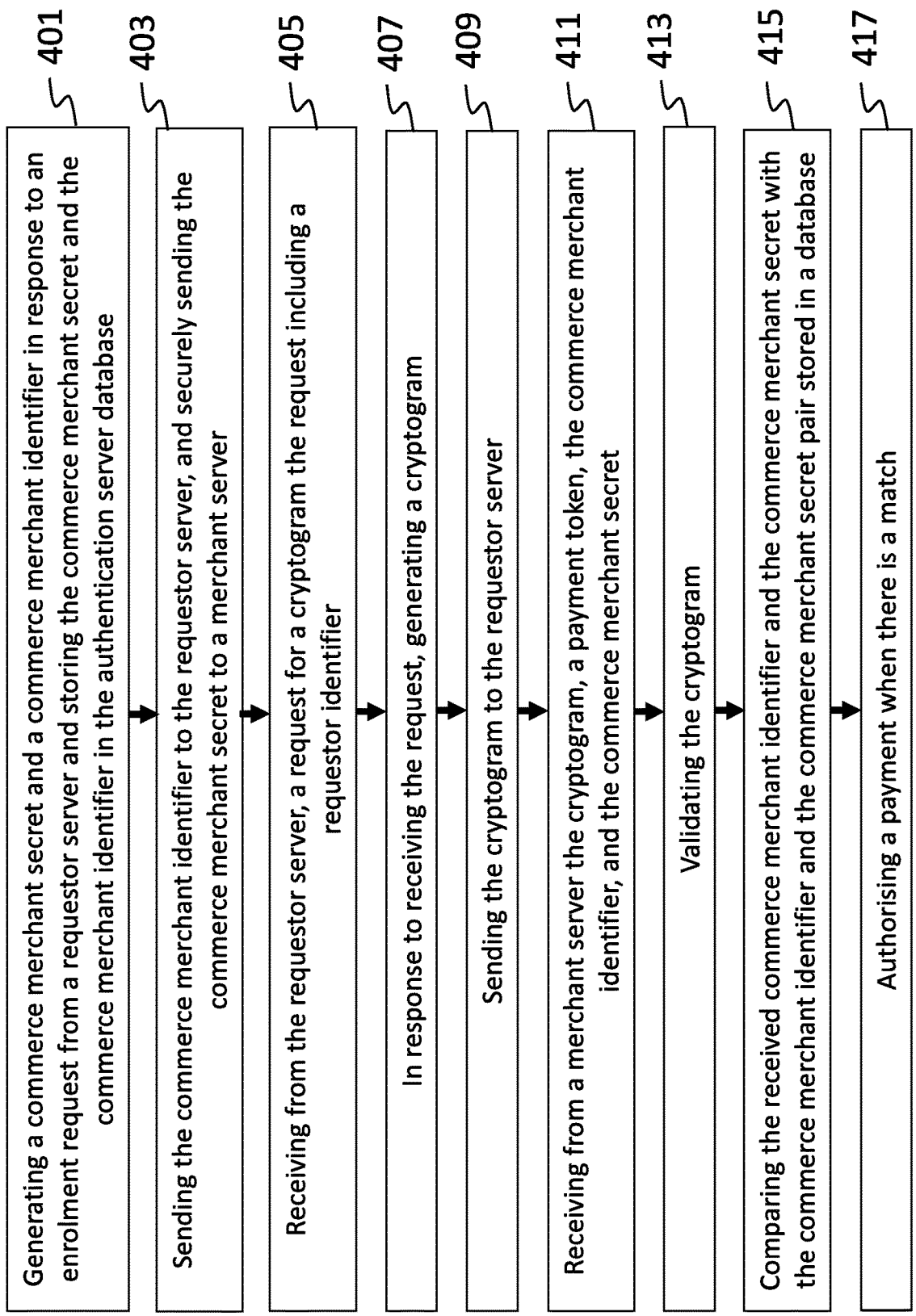
FIG. 4 is a process flow illustrating an exemplary authentication process flow at an authentication server according to some embodiments of the disclosure.

FIG. 4 illustrates an exemplary authentication process flow at authentication server 104, by which one or more aspects of the disclosure may be implemented. Although the process flow is presented in one arrangement, it should be clear that other embodiments may include additional or equivalent parts.

The illustrated process flow of the authentication server 104 generally comprises the authentication server 104 performing the following steps:

At step 401, generating a commerce merchant secret and a commerce merchant identifier in response to a request, for example, an enrollment request, from a requestor server 102 in relation to the merchant server 106 and storing the commerce merchant secret and the commerce merchant identifier as a pairing in the authentication server database 104a.

At step 403, sending, as part of a transaction, the commerce merchant identifier to the requestor server 102, and securely sending the commerce merchant secret to the merchant server 106.

At step 405, receiving from the requestor server 102, a request for a cryptogram, the request including a requestor identifier.

At step 407, in response to receiving the request, generating a cryptogram.

At step 409, sending the cryptogram to the requestor server 102.

At step 411, receiving from the merchant server 106 the cryptogram, a payment token, a commerce merchant identifier, and a commerce merchant secret.

At step 413, validating the cryptogram.

At step 415, comparing the commerce merchant identifier and the commerce merchant secret received from merchant server 106 with a commerce merchant identifier and a commerce merchant secret pair stored in authentication server database 104a.

At step 417, authorizing the transaction when there is a match.

Figure 5:
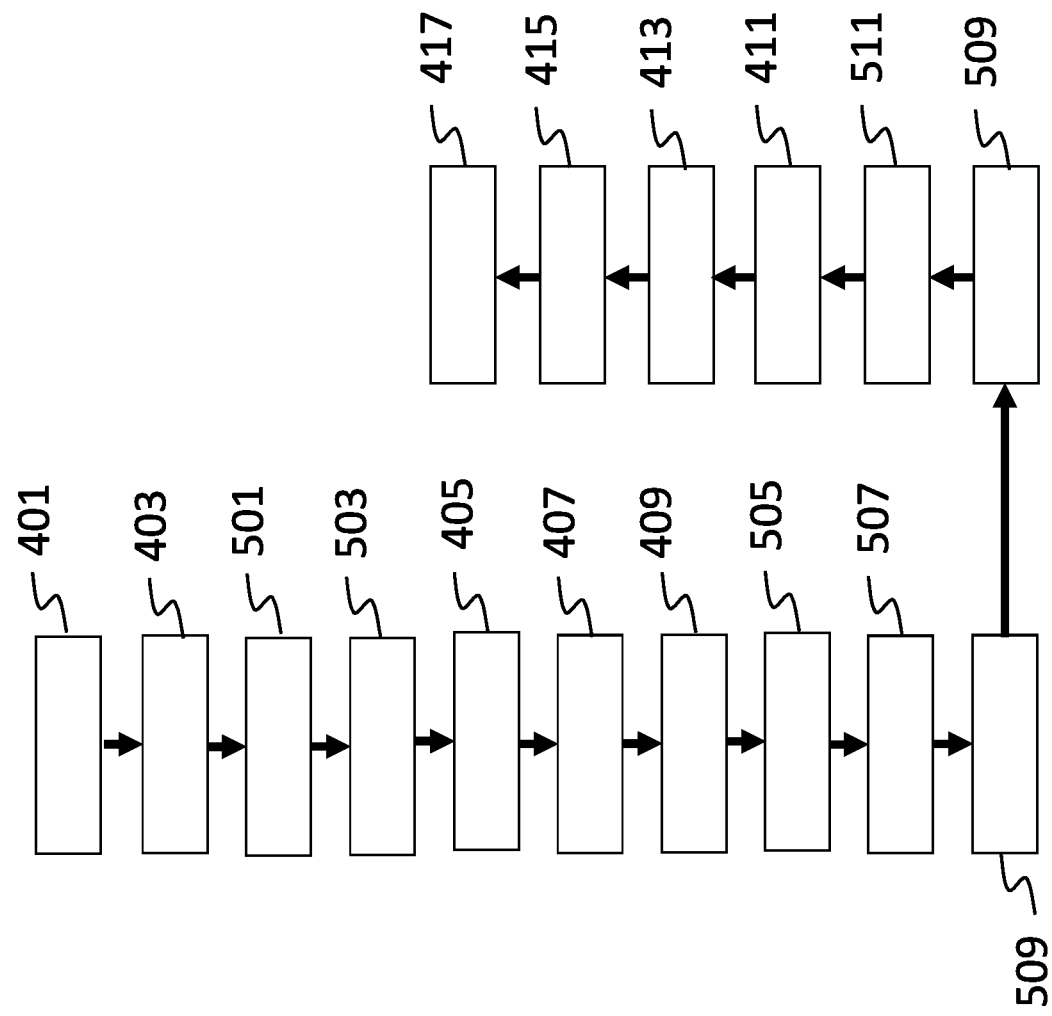
FIG. 5 is a process flow illustrating an exemplary authentication process flow of a multi-server system according to some embodiments of the disclosure.

FIG. 5 illustrates an exemplary authentication process flow of system 100, by which one or more aspects of the disclosure may be implemented. Although the process flow is presented in one arrangement, it should be clear that other embodiments may include additional or equivalent parts.

The illustrated process flow of the system 100 generally comprises the following steps:

At step 401, generating, at the authentication server 104, a commerce merchant secret and a commerce merchant identifier in response to an enrollment request from the requestor server 102, the enrollment request made in respect of merchant server 106, and storing the commerce merchant secret and the commerce merchant identifier as a pairing in the authentication server database 104a.

At step 403, sending, by the authentication server 104, the commerce merchant identifier to the requestor server 102 and the commerce merchant secret to the merchant server 106.

At step 501, receiving, at the requestor server 102, a purchase request from the user device 108 as part of a transaction.

At step 503, sending, by the requestor server 102 and to the authentications server 104, a request for a cryptogram, the request including a requestor identifier (TRID).

At step 405, receiving, at the authentication server 104, from the requestor server 102, the request for the cryptogram.

At step 407, in response to receiving the request, generating, by the authentication server 104, a cryptogram.

At step 409, sending, by the authentication server 104, the cryptogram to the requestor server 102.

At step 505, receiving, at the requestor server 102 from the authentication server 104, the cryptogram.

At step 507, sending, from the requestor server 102 to the merchant server 106, the cryptogram, a payment token, and the commerce merchant identifier.

At step 509, receiving, from the requestor server 102, at the merchant server 106, the cryptogram, the payment token, and the commerce merchant identifier.

At step 511, sending, from the merchant server 106 to the authentication server 104, the cryptogram, the payment token, the merchant identifier, and the commerce merchant secret.

At step 411, receiving from the merchant server 106, the cryptogram, the payment token, the commerce merchant identifier, and the commerce merchant secret.

At step 413, validating the cryptogram.

At step 415, comparing the received commerce merchant identifier and the commerce merchant secret with a commerce merchant identifier and a commerce merchant secret pair stored in the authentication server database 104a.

At step 417, authorizing the transaction when there is a match.

It will be appreciated that any of the methods described herein, and any particular step of said methods, can be implemented by a computer. Such implementation may take the form of a processor executing instructions stored on a non-transitory computer-readable medium or media, wherein when executed the instructions cause the processor to perform any one or more steps of any of the methods described herein. Individual steps of a method may be implemented by different processors that are all collectively acting in accordance with computer-readable instructions stored on one or more storage media. The processor, or processors, may be component(s) of system 100, for example, a processor of requestor server 102, authentication server 104, merchant server 106, and/or user device 108.

Figure 6:
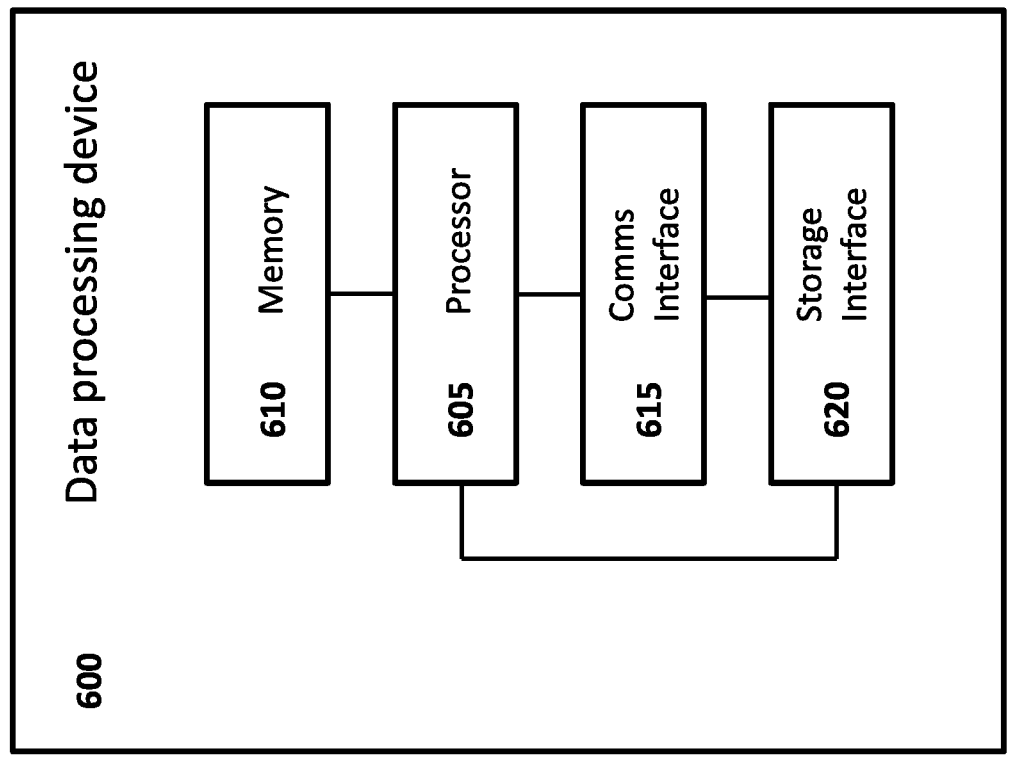
FIG. 6 is a block diagram of a data processing device that is suitable for performing the functions of any server of the system according to some embodiments of the disclosure.

By way of example, FIG. 6 shows, in schematic form, a data processing device 600 that is suitable for performing the functions of requestor server 102, authentication server 104, merchant server 106, and/or user device 108.

Data processing device 600 includes a processor 605 for executing instructions. Instructions may be stored in a memory 610, for example. Processor 605 may include one or more processing units (e.g., in a multi-core configuration) for executing instructions. The instructions may be executed within a variety of different operating systems on the data processing device 600, such as UNIX, LINUX, Microsoft Windows®, etc. More specifically, the instructions may cause various data manipulations on data stored in memory 610 (e.g., create, read, update, and delete procedures). It should also be appreciated that upon initiation of a computer-implemented method, various instructions may be executed during initialization. Some operations may be required in order to perform one or more methods described herein, while other operations may be more general and/or specific to a particular programming language (e.g., C, C#, C++, Java, or other suitable programming languages, etc.).

Processor 605 is operatively coupled to a communication interface 615 such that data processing device 600 is capable of communicating with a remote device, such as another data processing device of system 100. For example, communication interface 615 may receive communications from another member of system 100 depending on the function of data processing device 600 within the context of system 100.

Processor 605 may also be operatively coupled to a storage device, such as requestor server database 102a, authentication server database 104a or merchant server database 106a, depending on the function of data processing device 600 within the context of system 100. The storage device is any computer-operated hardware suitable for storing and/or retrieving data, where in the case of a secure storage medium the data is stored and retrieved securely.

Storage device can be integrated in data processing device 600, or it can be external to data processing device 600 and located remotely. For example, data processing device 600 may include one or more hard disk drives as a storage device. Alternatively, where the storage device is external to data processing device 600, it can comprise multiple storage units, such as hard disks or solid state disks, in a redundant array of inexpensive disks (RAID) configuration. The storage device may include a storage area network (SAN) and/or a network attached storage (NAS) system.

Processor 605 can be operatively coupled to the storage device via a storage interface 620. Storage interface 620 is any component capable of providing processor 605 with access to the storage device. Storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to the storage device.

Memory 610 may include, but is not limited to, random access memory (RAM), such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and submodules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media, such as a firmware, physical and virtual storage, CD-ROMs, DVDs, and any other digital source, such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques, including computer software, firmware, hardware or any combination or subset thereof, wherein the technical effect is enhancing the security of a multi-server e-commerce platform. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

With that said, and as described, it should be appreciated that one or more aspects of the present disclosure transform a general-purpose computing device into a special-purpose computing device (or computer) when configured to perform the functions, methods, and/or processes described herein.

In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, and as described, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the term "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer implemented method for providing authentication for secure transactions in a multi-server system, the method comprising:
   receiving, at an authentication server from a requestor server, a first request for a cryptogram, the first request being associated with a transaction and including a requestor identifier;
   in response to receiving the first request, generating the cryptogram;
   sending, from the authentication server, the cryptogram to the requestor server;
   receiving, at the authentication server from a merchant server, a message including the cryptogram, a payment token, a unique merchant identifier, and a merchant secret, wherein the unique merchant identifier is included in a first field of the message designated for an expiration date and the merchant secret is included in a second field of the message designated for a card verification code;
   validating, by the authentication server, the cryptogram;
   comparing, by the authentication server, the unique merchant identifier and the merchant secret with a unique merchant identifier and a merchant secret pair stored in a database; and
   authorizing, by the authentication server, the transaction when there is a match.

2. The computer implemented method of claim 1, further comprising:
   generating, by the authentication server, the merchant secret and the unique merchant identifier, in response to receiving a second request from the requestor server prior to receiving the first request from the requestor server;
   storing the merchant secret and the unique merchant identifier in the database in association with one another;
   sending, from the authentication server to the requestor server, the unique merchant identifier; and
   sending, from the authentication server to the merchant server via a secure channel, the merchant secret.

3. The computer implemented method of claim 2, wherein the second request is an enrollment request.

4. The computer implemented method of claim 1, further comprising receiving, at the authentication server from the requestor server, an amount; and
   wherein the cryptogram validation includes a validation of the amount received from the requestor server.

5. The computer implemented method of claim 1, further comprising:
   receiving, at the merchant server from the requestor server, the cryptogram, the payment token, and the unique merchant identifier; and
   sending, from the merchant server to the authentication server, the cryptogram, the payment token, the unique merchant identifier, and the merchant secret.

6. The computer implemented method of claim 1, further comprising:
   receiving, at the requestor server from the authentication server, the cryptogram; and
   sending, from the requestor server to the merchant server, the cryptogram, the payment token, and the unique merchant identifier.

7. The computer implemented method of claim 1, wherein the cryptogram is a dynamic cryptogram.

8. The computer implemented method of claim 1, wherein the unique merchant identifier is a 4 character code.

9. The computer implemented method of claim 1, wherein the merchant secret is a 3 character code.

10. The computer implemented method of claim 1, wherein the requestor identifier is a Token Requestor Identifier.

11. A system for providing authentication for secure transactions, the system comprising at least one processor configured to:
    receive, from a requestor server, a first request for a cryptogram, the first request associated with a transaction and including a requestor identifier;
    in response to receipt of the first request, generate the cryptogram;
    send the cryptogram to the requestor server;
    receive, from a merchant server, a message including the cryptogram, a payment token, a unique merchant identifier, and a merchant secret, wherein the unique merchant identifier and the merchant secret are included in a first field of the message designated for an expiration date and a second field of the message designated for a card verification code, respectively;
    validate the cryptogram;
    compare the unique merchant identifier and the merchant secret with a unique merchant identifier and a merchant secret pair stored in a database; and
    authorize the transaction when there is a match.

12. The system of claim 11, wherein the at least one processor is further configured to:
    receive a second request from the requestor server prior to receiving the first request from the requestor server;
    in response to receiving the second request, generate the merchant secret and the unique merchant identifier;
    store the merchant secret and the unique merchant identifier in the database in association with one another;
    send, to the requestor server, the unique merchant identifier; and
    send, to the merchant server via a secure channel, the merchant secret.

13. The system of claim 11, wherein the at least one processor is further configured to:
    receive, from the requestor server, an amount; and
    wherein the cryptogram validation includes a validation of the amount received from the requestor server.

14. A non-transitory computer-readable storage medium storing executable instructions thereon for providing authentication for secure transactions in a multi-server system, which, when executed by at least one processor of the multi-server system, cause the at least one processor to:
    receive, from a requestor server, a first request for a cryptogram, the first request associated with a transaction and including a requestor identifier;
    in response to receipt of the first request, generate the cryptogram;
    send the cryptogram to the requestor server;
    receive, from a merchant server, a message including the cryptogram, a payment token, a unique merchant identifier, and a merchant secret, wherein the unique merchant identifier and the merchant secret are included in a first field of the message designated for an expiration date and a second field of the message designated for a card verification code, respectively;
    validate the cryptogram;
    compare the unique merchant identifier and the merchant secret with a unique merchant identifier and a merchant secret pair stored in a database; and
    authorize the transaction when there is a match.

15. The non-transitory computer-readable storage medium of claim 14, wherein the executable instructions, when executed by the at least one processor of the multi-server system, further cause the at least one processor to:
- receive a second request from the requestor server prior to receiving the first request from the requestor server;
- in response to receiving the second request, generate the merchant secret and the unique merchant identifier;
- store the merchant secret and the unique merchant identifier in the database in association with one another;
- send, to the requestor server, the unique merchant identifier; and
- send, to the merchant server via a secure channel, the merchant secret.

16. The non-transitory computer-readable storage medium of claim 14, wherein the executable instructions, when executed by the at least one processor of the multi-server system, further cause the at least one processor to:
- receive, from the requestor server, an amount; and
- wherein the cryptogram validation includes a validation of the amount received from the requestor server.

\* \* \* \* \*